(12) United States Patent
Mar (10) Patent No.: US 9,852,650 B2
(45) Date of Patent: Dec. 26, 2017

(54) SIMULATION DEVICE (71) Applicant: Advanced Training System LLC, St. Petersburg, FL (US)

(72) Inventor: Enrique Mar, Mexico City (MX)

(73) Assignee: Advanced Training Systems, LLC, St. Petersburg, FL (US)

( * ) Notice: Subject to any disclaimer, the term of this patent is extended or adjusted under 35 U.S.C. 154(b) by 256 days.

(21) Appl. No.: 14/790,460

(22) Filed: Jul. 2, 2015

(65) Prior Publication Data
US 2017/0053547 A1 Feb. 23, 2017

(51) Int. Cl.
*G09B 9/04* (2006.01)
*G09B 9/05* (2006.01)

(52) U.S. Cl.
CPC .............. *G09B 9/04* (2013.01); *G09B 9/05* (2013.01)

(58) Field of Classification Search
CPC ... G09B 9/04; G09B 9/05; G09B 9/52; G09B 9/06; G09B 9/003; G09B 9/006; A61B 5/16; A61B 5/18; A61B 5/162
USPC ........................................ 434/64, 69
See application file for complete search history.

(56) References Cited

U.S. PATENT DOCUMENTS

| | | | | |
|---|---|---|---|---|
| 2,710,783 A * | 6/1955 | Chaft | ...................... | A47B 21/02 312/28 |
| 4,678,197 A * | 7/1987 | Stein | ...................... | B60B 29/002 180/236 |
| 5,433,670 A | 7/1995 | Trumbull | | |
| 5,527,184 A * | 6/1996 | Trumbull | ............... | A63G 31/16 434/29 |
| 6,354,838 B1 * | 3/2002 | Tagge | ...................... | A63F 13/08 434/29 |
| 7,717,798 B2 * | 5/2010 | Bellows | ................... | A47D 9/02 472/36 |

* cited by examiner

*Primary Examiner* — Robert J Utama
*Assistant Examiner* — Lily M Del Valle
(74) *Attorney, Agent, or Firm* — Larson & Larson, P.A.; Frank Liebenow (57) ABSTRACT

A simulator device, comprising several components, in combination. There is an outer frame and an inner frame. The inner frame moves relative to the outer frame. The inner frame has two bevels which ride on two rollers to prevent cantilever of the inner frame. The bevels also provide a lifting of one end of the inner frame. There is an arcuate plate, which allows hydraulic rocking of a seat to about a six degree forward tilt or rearward tilt.

11 Claims, 8 Drawing Sheets

SIMULATION DEVICE

RULE 1.78(F)(1) DISCLOSURE

The Applicant has not submitted a related pending or patented non-provisional application within two months of the filing date of this present application. The invention is made by a single inventor, so there are no other inventors to be disclosed. This application is not under assignment to any other person or entity at this time.

BACKGROUND OF THE INVENTION

Field of the Invention

The present invention relates to a simulation device and more particularly pertains to a device for providing simulated driving training.

Description of the Prior Art

The use of training simulators is known in the prior art. More specifically, training simulators previously devised and utilized for the purpose of using stationary locations to teach skills for managing a moving vehicle are known to consist basically of familiar, expected, and obvious structural configurations of familiar, expected, and obvious structural configurations, notwithstanding the number of designs encompassed by the prior art which has been developed for the fulfillment of stated objectives and requirements.

While the prior art devices fulfill their respective, particular objectives and requirements, the prior art does not describe simulation device that allows a device for providing simulated driving training.

In this respect, the simulation device, according to the present invention, substantially departs from the conventional concepts and designs of the prior art, and in doing so provides an apparatus primarily developed for the purpose providing a means to simulate driving for purposes of training.

Therefore, it can be appreciated that there exists a continuing need for a new and improved simulation device which can be used for providing simulated driving training. In this regard, the present invention substantially fulfills this need.

SUMMARY OF THE INVENTION

In view of the foregoing disadvantages inherent in the known types of training simulators now present in the prior art, the present invention provides an improved simulation device. As such, the general purpose of the present invention, which will be described subsequently in greater detail, is to provide a new and improved simulation device which has all the advantages of the prior art and none of the disadvantages.

In describing this invention, the word "coupled" is used. By "coupled" is meant that the article or structure referred to is joined, either directly, or indirectly, to another article or structure. By "indirectly joined" is meant that there may be an intervening article or structure imposed between the two articles which are "coupled". "Directly joined" means that the two articles or structures are in contact with one another or are essentially continuous with one another.

By adjacent to a structure is meant that the location is near, or next to, the identified structure. The term "next to" is used to mean and describe one item which is within the approximate area of an identified structure, such as "the red house is next to the white house", meaning that in the order of occurrence, the red house follows or precedes the white house.

To attain this, the present invention is described. The present invention essentially comprises a simulator device, which comprises several components, in combination.

There is first an outer frame. The outer frame comprises a pair of generally mirror image rectilinear shaped outer frame lower rails. The lower rails being a right outer frame lower rail and a left outer frame lower rail. Each of the outer frame lower rails has an inner surface, an outer surface, a upper surface, a bottom surface, a forward end, and a rearward end, with a length there between. The outer frame lower rails are oriented to be generally parallel with each other.

There are a plurality of outer frame lower rail cross members. The outer frame lower rail cross members couple the right lower rail and the left lower rail. Each of the outer frame lower rail cross members has an inner surface, a upper surface, a bottom surface, and a rearward surface. Each outer frame lower rail cross member has a right end and a left end, with a length there between.

The plurality of outer frame lower rail cross members comprise a forward cross member, an inner forward cross member, an inner rearward cross member, and a rearward cross member. Each outer frame lower rail cross members having an upper surface.

The lower rail inner forward cross member of the outer frame has a pair of bevel roller wheels coupled to the upper surface of the outer frame lower rail inner forward cross member.

There is a pair of generally mirror image rectilinear shaped outer frame upper rails, being a right outer frame upper rail and a left outer frame upper rail. Each of the outer frame upper rails has an inner surface, an outer surface, and a upper surface, a bottom surface, a forward end, and a rearward end, with a length there between.

The outer frame lower rails and the outer frame upper rails are coupled to each other.

There are a plurality of right outer frame riser rails coupling the right upper outer frame rail to the right lower outer frame rail. The right outer frame riser rails are a right forward outer frame riser, a right middle outer frame riser, and a right rearward outer frame riser.

There are a plurality of left outer frame riser rails coupling the left outer frame upper rail to the left outer frame lower rail. The left outer frame riser rails are a left forward outer frame riser and a left middle outer frame riser and a left rearward outer frame riser.

The outer frame also comprises a pair of generally mirror image rectilinear shaped outer frame middle horizontal rails, being an outer frame right middle horizontal rail and an outer frame left horizontal rail. Each outer frame middle horizontal rail has an upper surface, a lower surface, and a pair of generally parallel side surfaces, as well as a forward end and a rearward end, with a length there between. The outer frame lower rails are generally parallel with each other.

There is also an inner frame. The inner frame comprises several components, in combination.

There is a pair of generally mirror image rectilinear shaped inner frame outer rails, being a right inner frame outer rail and a left inner frame outer rail. Each of the inner frame outer rails has an inner surface, an outer surface, a upper surface, a bottom surface, a forward end, and a rearward end, with a length there between. The inner frame outer rails are configured to be generally parallel with each other.

The forward end of each of the inner frame outer rails has a downwardly disposed bevel projection. Each bevel projection has a lower edge. The lower edge of each of the downwardly disposed bevel projections of the inner frame outer rails rides on each of the bevel roller wheels of the lower rail inner forward cross member of the outer frame.

There is a pair of inner frame support rails. Each of the inner frame support rails has a generally mirror image configuration. The inner frame support rails each are a generally mirror image of each other. The inner frame support rails each have an upper surface, a bottom surface, an inner surface, an outer surface, a forward end, and a rearward end, with a length there between. Each of the inner frame support rails is located adjacent the inner surface of each of the inner frame outer rails.

Each of the pair of inner frame support rails has a plurality of horizontally oriented arcuate roller subassembly mount holes there through. Each of the horizontally oriented arcuate roller subassembly mount holes of the inner frame support rails has an associated horizontally oriented arcuate roller subassembly coupled thereto. Each horizontally oriented arcuate roller subassembly has a horizontally oriented stepped central shaft having a male threaded end, and an associated nut. Each horizontally oriented arcuate roller subassembly has a vertically oriented roller.

The inner surface of each of the inner frame support rails has an L-shaped roller subassembly mount. Each of the L-shaped roller subassembly mounts of the inner frame support rails has a generally downwardly disposed outer leg and a horizontally disposed inner leg. The horizontally disposed inner leg has a roller shaft hole there through. Each of the horizontally oriented roller subassembly mounts has an associated vertically oriented roller subassembly. Each inner frame support rail vertically oriented roller subassembly has a stepped vertically oriented central roller shaft. Each vertically oriented roller shaft of the vertically oriented roller subassembly has a male threaded end and an associated nut. The vertically oriented central shaft of each vertically oriented roller subassembly being configured to be received by and mate with the roller shaft hole of the horizontally disposed inner leg of the roller mount. The inner frame support rails are generally parallel with each other.

There is a pair of inner frame inner rails. The inner frame inner rails each are a generally mirror image of each other. The inner frame inner rails each have an upper surface, a bottom surface, an inner surface, an outer surface, a forward end, and a rearward end, with a length there between. Each of the inner frame inner rails is located adjacent the inner surface of each of the inner support rails.

The rearward end of inner surface of each of the inner frame inner rails has an arcuate slot plate attached thereto. Each arcuate slot plate has a upper surface, a bottom surface, and a pair of parallel side surfaces, being an outer surface and an inner surface. Each arcuate slot plate has a forward end and a rearward end, with a length there between. Each arcuate slot plate has a pair of arcuate slots there through. Each arcuate slot running from the inner surface of the arcuate slot plate to the outer surface of the arcuate slot plate, there through.

The arcuate slot plates are located between the inner frame inner rail and the inner frame support rail. The arcuate slot plates allow for movement of the inner frame inner rails relative to the inner frame support rails.

The arcuate slots of the arcuate slot plates are configured to movably receive and mate with each of the vertically oriented rollers of the horizontally oriented roller subassemblies, so as to produce a rocking effect as the arcuate plate moves relative to the vertical rollers of the horizontally oriented roller subassemblies.

The vertically oriented roller subassembly horizontally oriented rollers contacting and riding on the inner surface of each of the arcuate slot plates. The inner surface of each of the arcuate slot plates being generally flat and configured to run along each of the horizontally oriented rollers of each of the vertically oriented arcuate roller subassemblies.

There are a plurality of inner frame cross struts, being an forward inner frame crosse strut, a mid forward inner frame cross strut and a middle inner frame cross strut and a rearward inner frame cross strut. Each of the inner frame cross struts has a bottom surface, a upper surface, a forward surface, a rearward surface, and a right end and a left end, with a length there between. Each of the inner frame cross struts is a generally mirror image of each other. Each inner frame cross strut end is coupled to the inner surface of the inner frame outer rails.

The inner frame and the outer frame being movably coupled to the other.

There are a pair of inner frame seat mount rails, which couple with each inner frame inner rail, and are oriented generally perpendicular to the inner frame inner rails. Each of the seat mount rails having an inner surface, Each of the inner frame seat mount rails having a upper surface, a lower surface, a forward surface, a rearward surface a right end, a left end and a length there between.

There is an inner frame seat mount central hydraulic strut. The inner frame seat mount central hydraulic strut has an upper surface, an lower surface, a forward surface, a rearward surface, a right end, and a left end. The ends of the inner frame seat mount central hydraulic strut are coupled to each of the inner surface of each of the inner frame seat mount rails.

There is a hydraulic cylinder. The hydraulic cylinder has a base and a ram, with the ram being coupled to the inner frame.

The ram of the hydraulic cylinder is coupled to the rearward cross member of the inner frame. The movement of the hydraulic ram causes a movement of the seat mount of the inner frame.

The hydraulic cylinder base is coupled to the inner frame seat mount central hydraulic strut.

There are a pair of adjustable outer mount inertia balance springs. The inertia balance springs couple the inner rearward cross member of the outer frame and the forward end of the inner frame.

There is a system control for controlling a forward and a rearward movement of a seat, by moving the seat using the hydraulic cylinder to provide such movement. The control is operatively coupled to a computer having a program, hardware, and software. The computer controls a visual display on a computer screen. The computer is electronically coupled to a user control means. The user control means is at least one of the means from the group of control means which includes pedals, steering wheels, shifts, levers, buttons, switches, toggles, pulls, and joysticks, for providing a visual simulation with movement simulation.

There is a seat belt simulation subassembly. The seat belt simulation subassembly comprises an adjustable seat belt, a pivotable coupler, an actuator, a spring, an arcuate pulley, and a terminal attachment.

There is a user's seat which is coupled to the seat mount rails. The seat belt is coupled to a user's seat. The pivotable coupler allows the seat belt to be rotated. The spring provides a predetermined tension to the belt. The actuator os operatively coupled to the control so as to add to the simulation of braking and accelerating by the movement of the actuator, in addition to the spring tension of the seat belt, providing a change in the sensation of tension which would occur during braking or accelerating.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures and systems for carrying out the several purposes of the present invention. It is important, therefore, that the claims be regarded as including such equivalent constructions insofar as they do not depart from the spirit and scope of the present invention.

It is therefore an object of the present invention to provide a new and improved simulation device which has all of the advantages of the prior art training simulators and none of the disadvantages.

It is another object of the present invention to provide a new and improved simulation device which may be easily and efficiently manufactured and marketed.

It is further object of the present invention to provide a new and improved simulation device which is of durable and reliable constructions.

An even further object of the present invention is to provide a new and improved simulation device which is susceptible of a low cost of manufacture with regard to both materials and labor, and which accordingly is then susceptible of low prices of sale to the consuming public, thereby making such simulation device economically available to the buying public.

Even still another object of the present invention is to provide a simulation device for providing simulated driving training.

Lastly, it is an object of the present invention to provide a new and improved simulator device, comprising several components, in combination. There is an outer frame and an inner frame. The inner frame moves relative to the outer frame. The inner frame has two bevels which ride on two rollers to prevent cantilever of the inner frame. The bevels also provide a lifting of one end of the inner frame. There is an arcuate plate, which allows hydraulic rocking of a seat to about a six degree forward tilt or rearward tilt.

It should be understood that while the above-stated objects are goals which are sought to be achieved, such objects should not be construed as limiting or diminishing the scope of the claims herein made.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
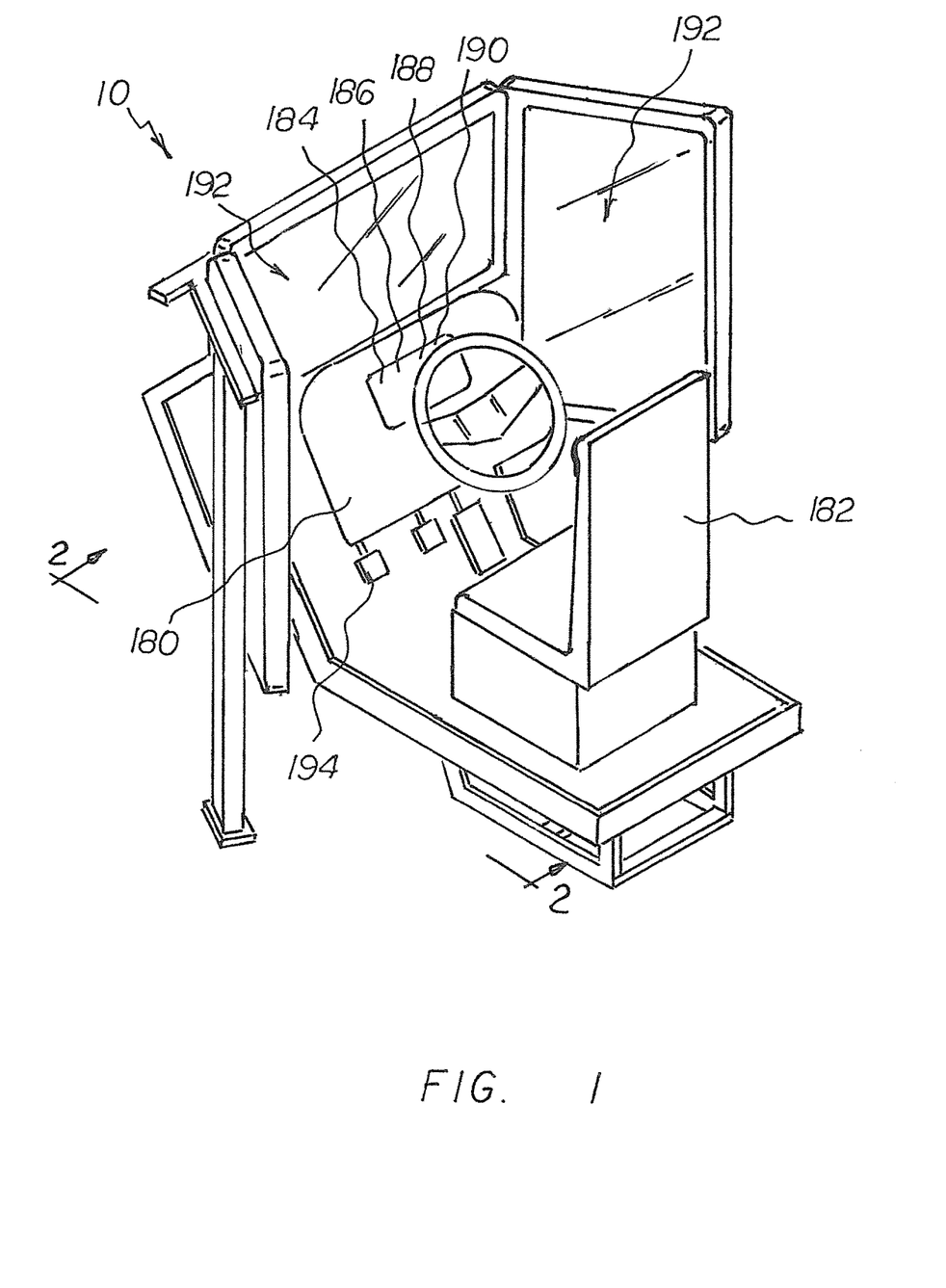
FIG. 1 is a perspective view of the device as presented to a user, showing the seat, viewing screens, and controls.
Figure 2:
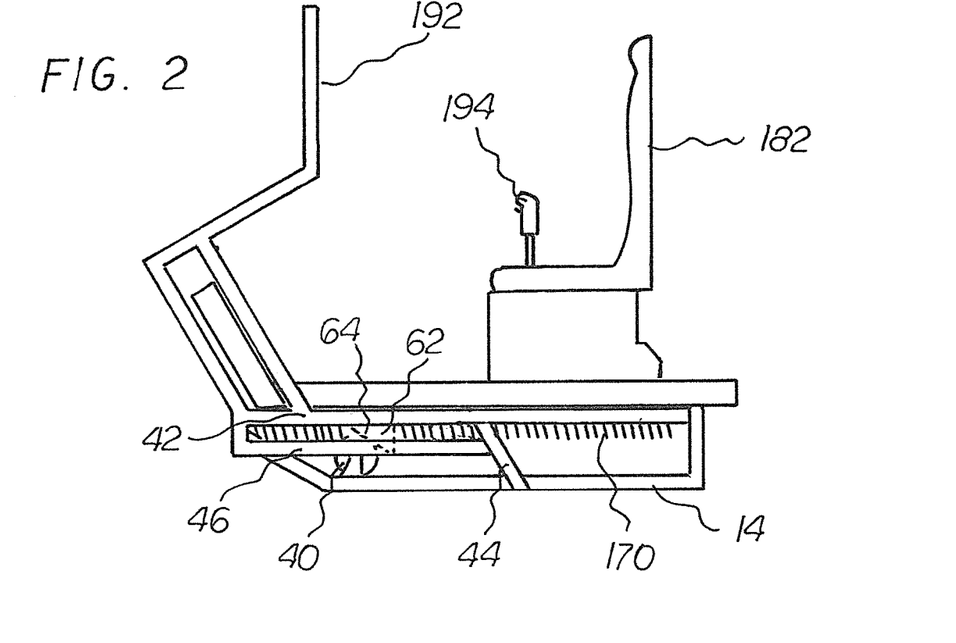
FIG. 2 is a view taken along line 2-2 of FIG. 1.
Figure 3:
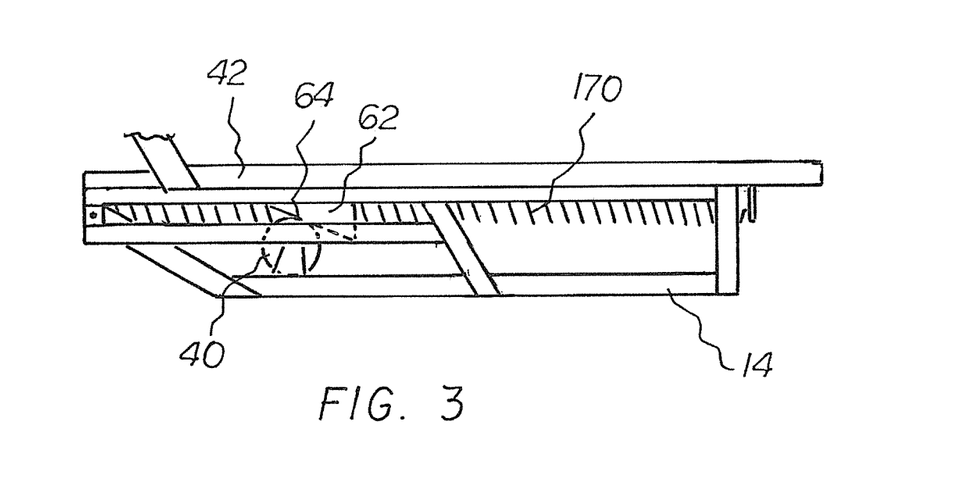
FIG. 3 is a close up side view of the lower portion of FIG. 2, showing the outer frame and inertia balancing spring, as well as the bevel and bevel roller.
Figure 4:
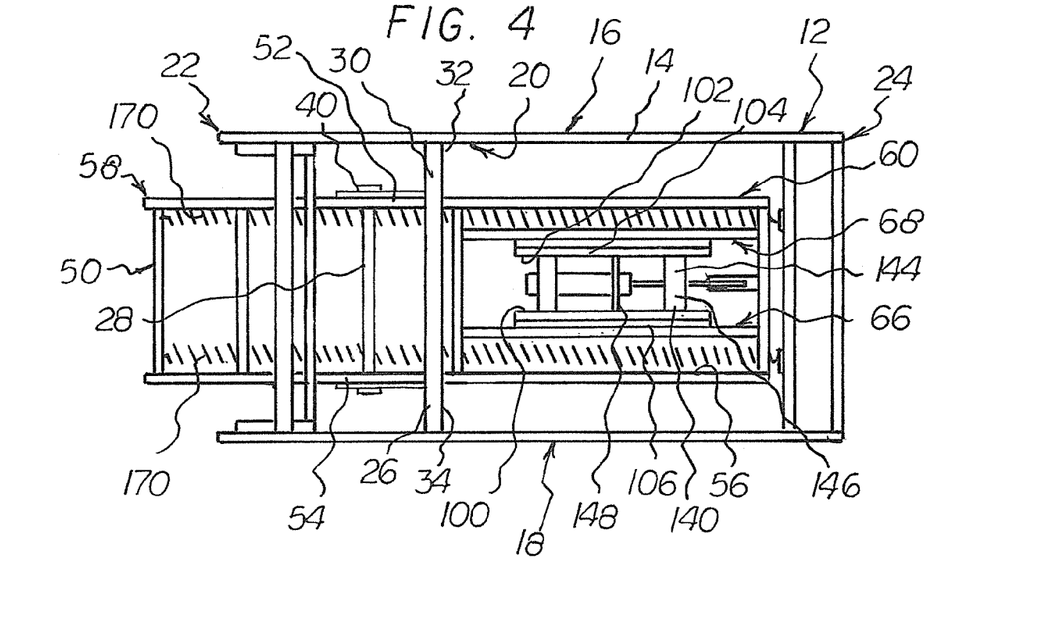
FIG. 4 is a bottom plan view of the outer and inner frames and the components of the frames. The view shows the relationship of the frames to each other.
Figure 5:
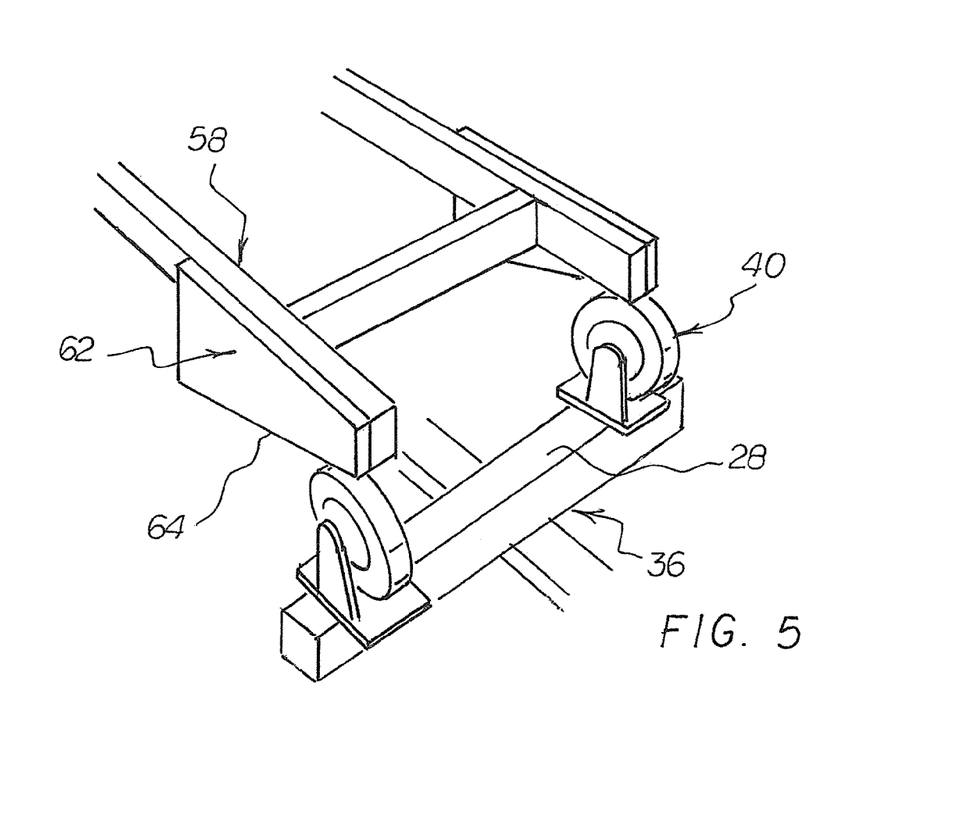
FIG. 5 is a close up view of the inner frame bevels rising on the outer frame bevel rollers.
Figure 6:
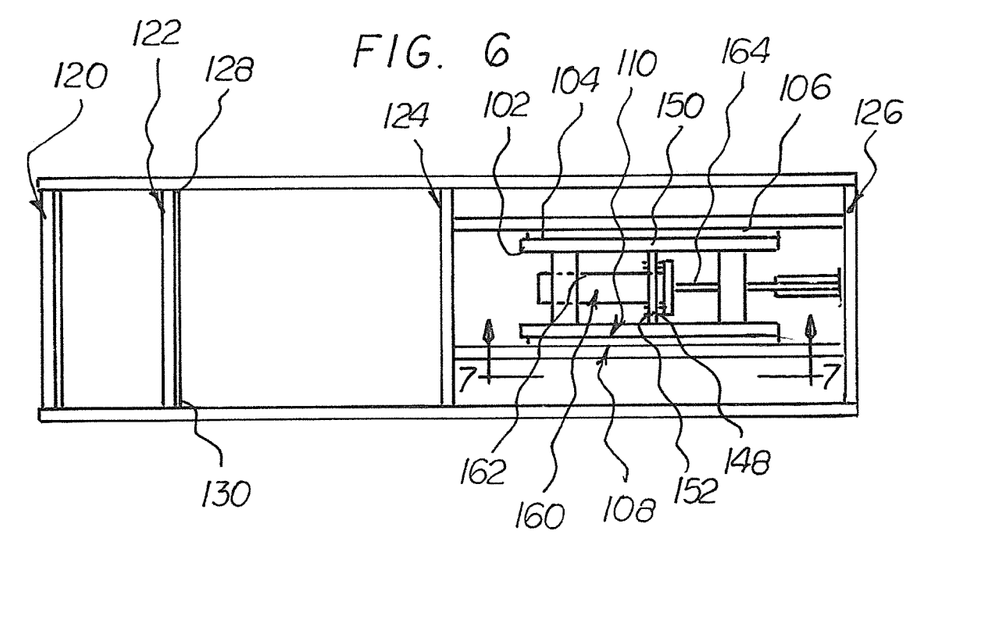
FIG. 6 is a top plan view of the inner frame.
Figure 7:
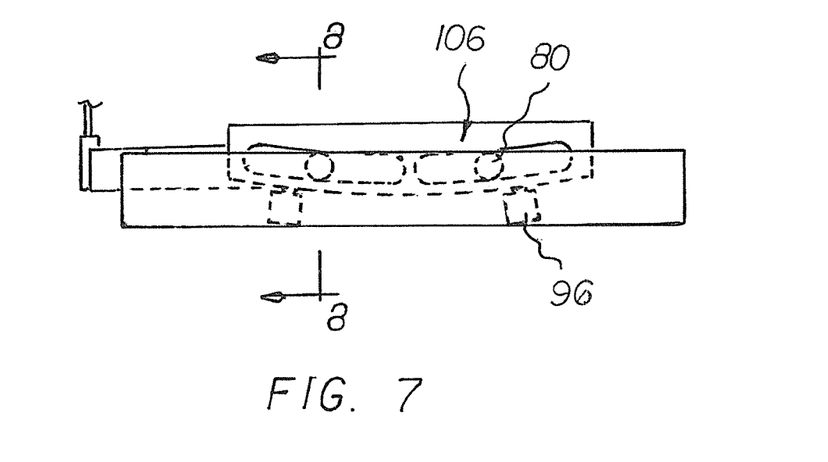
FIG. 7 is a view taken along line 7-7 of FIG. 6.
Figure 8:
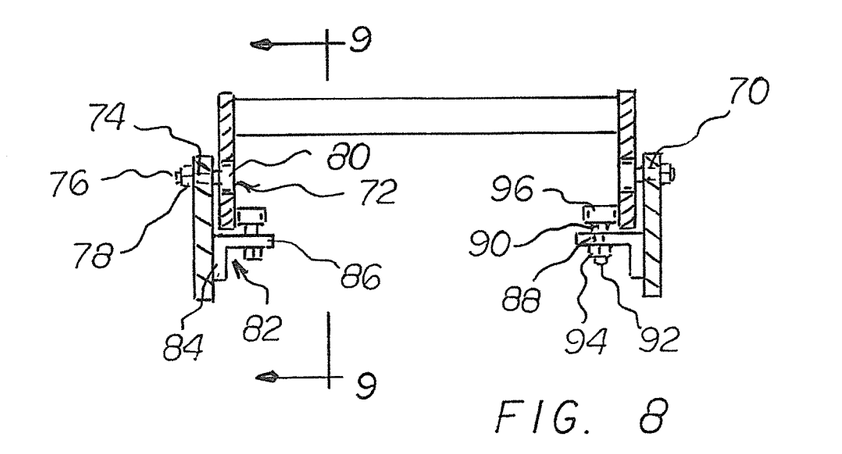
FIG. 8 is a view taken along line 8-8 of FIG. 7.
Figure 9:
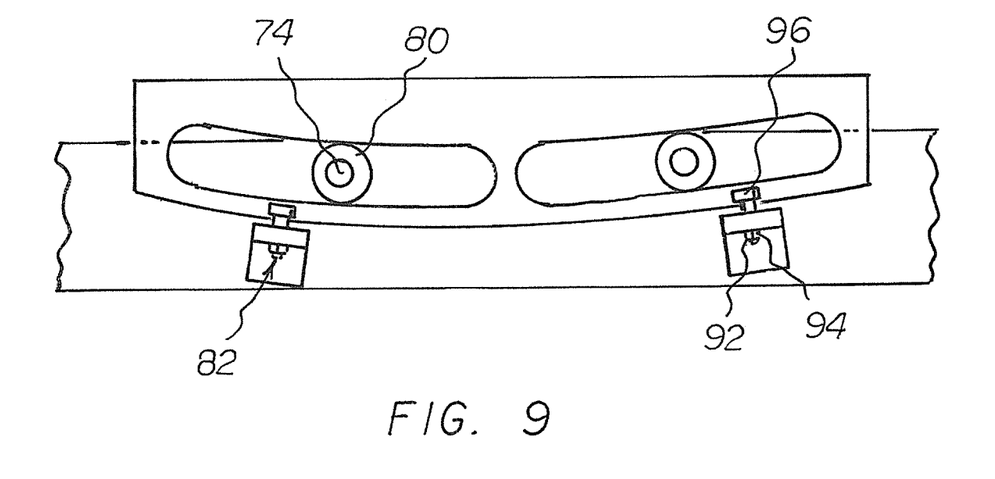
FIG. 9 is a view taken along line 9-9 of FIG. 8.
Figures 10, 10A, 10B:
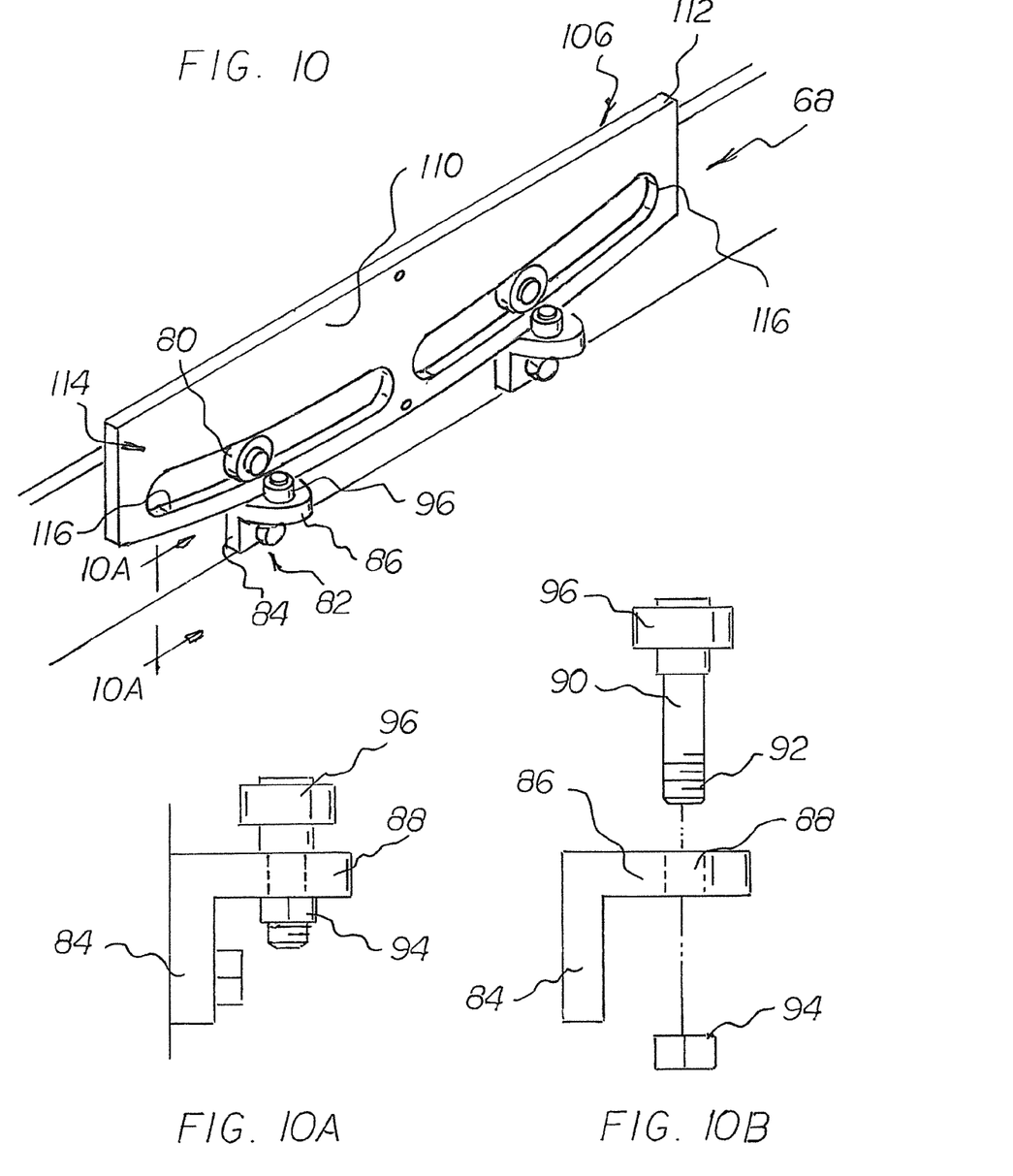
FIG. 10 is a top perspective view of the arcuate plate located on the inside of the inner frame support rail. Note how the vertical rollers of the horizontal roller subassembly engage the slots of the arcuate plate. Note, also, the horizontal rollers of the vertical roller subassembly riding on the inner surface of the arcuate plate, keeping the plate in position.
FIG. 10A is a side elevation view taken along line 10A-10A of FIG. 10.
FIG. 10B is an exploded view of the vertically oriented roller subassembly, horizontally oriented roller.
Figure 11:
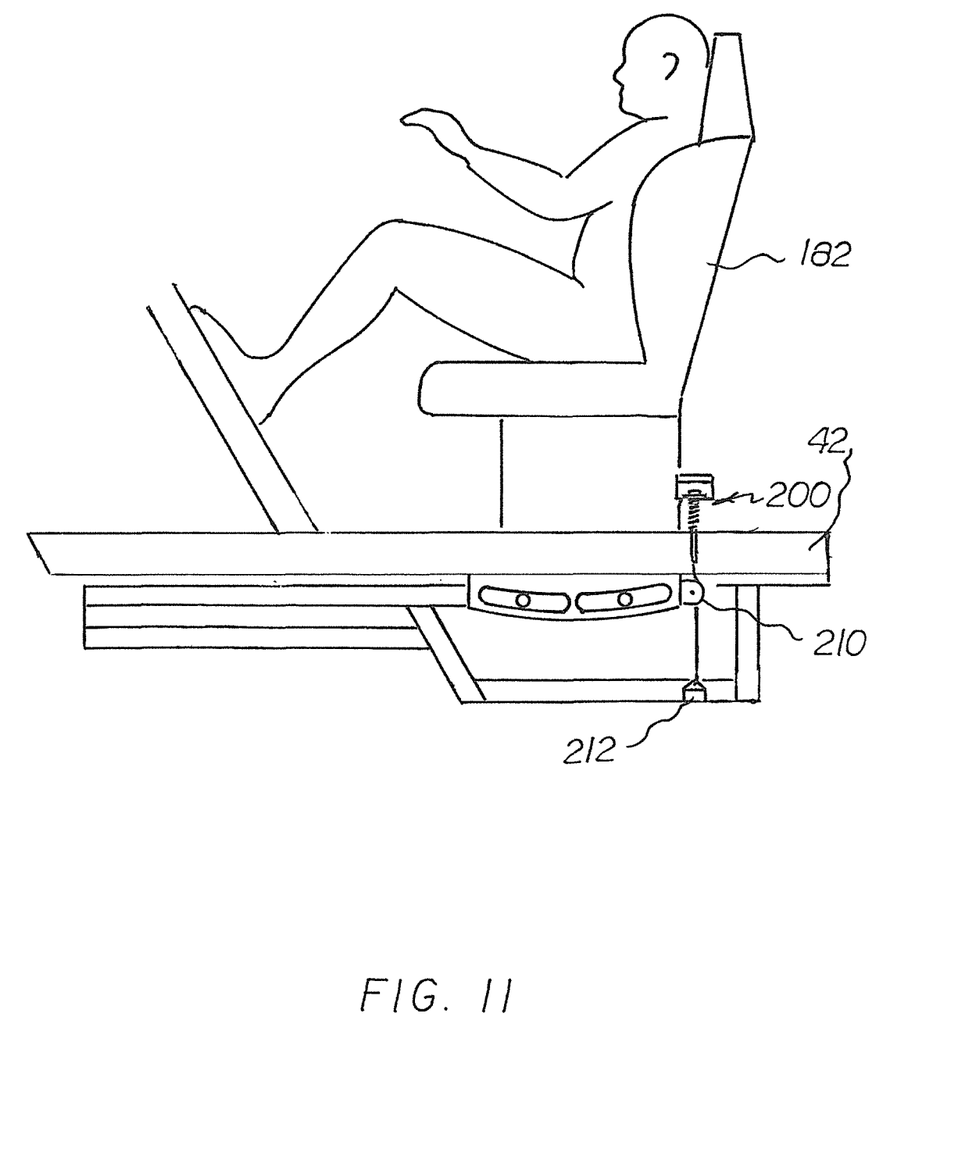
FIG. 11 is a side elevational view showing the user in position in the seat, with the seat belt subassembly in place, with the arcuate plate in a neutral orientation.
Figure 12:
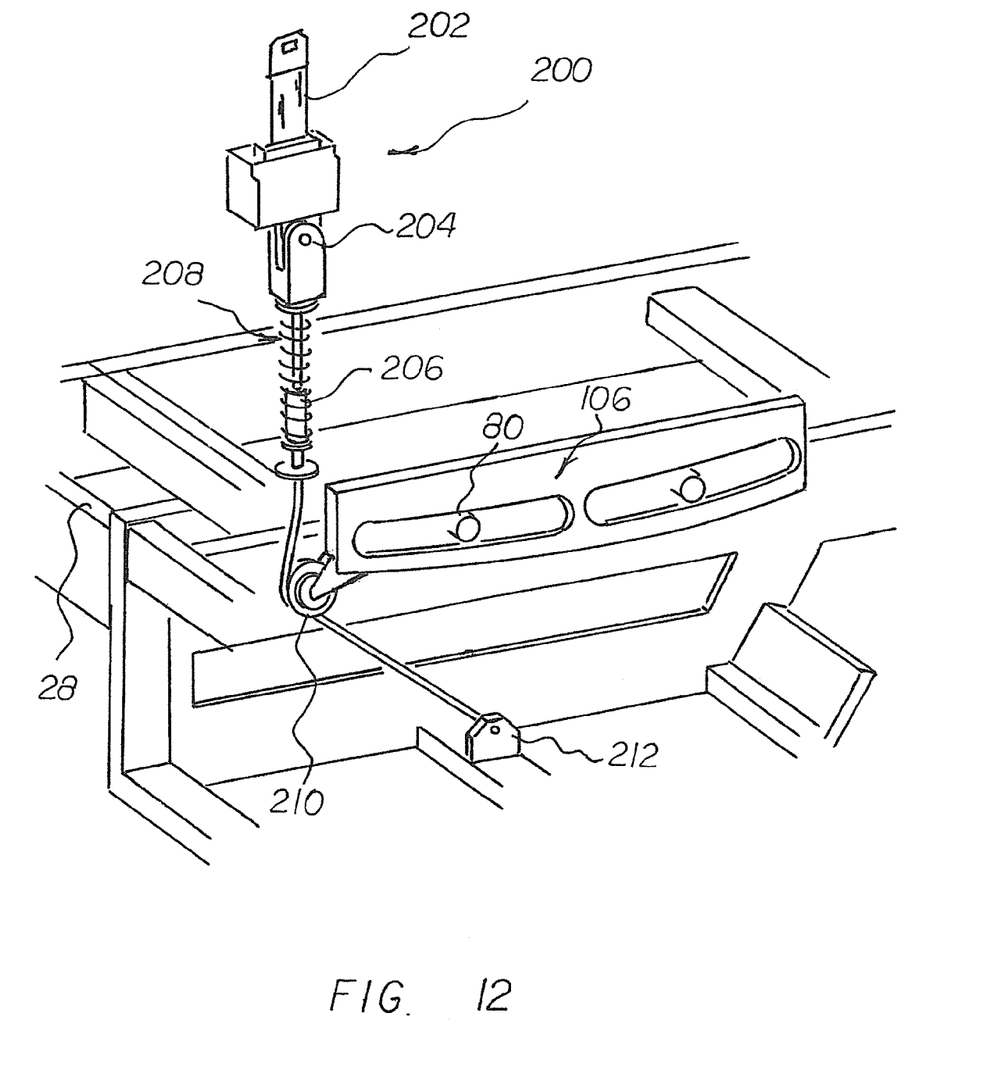
FIG. 12 is a close up view of the arcuate plate and seat belt subassembly. As the arcuate plate moves forward, simulating acceleration of vehicle, the user would be rocked back, and the belt would loosen. Alternately, if the arcuate plate is moved rearward, the user's seat pitches forward, simulating braking, and the belt would then tighten, to provide the physical cue that braking is occurring.

With reference now to the drawings, and in particular to FIG. 1 thereof, the preferred embodiment of the new and improved simulation device embodying the principles and concepts of the present invention and generally designated by the reference numeral 10 will be described.

The present invention, the simulation device 10 is comprised of a plurality of components. Such components in their broadest context include an outer frame, an inner frame slidably mounted on the outer frame, a control and a hydraulic cylinder operated by the control, so as to simulate movement, both acceleration and deceleration. Such components are individually configured and correlated with respect to each other so as to attain the desired objective.

A simulator device 10, comprising, in combination, is described. There is first an outer frame 12. The outer frame comprises a pair of generally mirror image rectilinear shaped outer frame lower rails 14. The lower rails being a right outer frame lower rail 16 and a left outer frame lower rail 18. Each of the outer frame lower rails has an inner surface 20, an outer surface, a upper surface, a bottom surface, a forward end 22, and a rearward end 24, with a length there between. The outer frame lower rails are oriented to be generally parallel with each other.

There are a plurality of outer frame lower rail cross members 26. The outer frame lower rail cross members couple the right lower rail and the left lower rail. Each of the outer frame lower rail cross members has an inner surface, a upper surface 28, a bottom surface 30, and a rearward surface. Each outer frame lower rail cross member has a right end 32 and a left end 34, with a length there between.

The plurality of outer frame lower rail cross members comprise a forward cross member, an inner forward cross member 36, an inner rearward cross member, and a rearward cross member.

The lower rail inner forward cross member of the outer frame has a pair of bevel roller wheels 40 coupled to the upper surface of the outer frame lower rail inner forward cross member.

In a variation, each cross member may run from outer frame lower rail to outer frame lower rail. In the preferred embodiment the lower rail inner forward cross member is not attached to the outer frame lower rail.

There is a pair of generally mirror image rectilinear shaped outer frame upper rails, being a right outer frame upper rail and a left outer frame upper rail 42. Each of the outer frame upper rails has an inner surface, an outer surface, and a upper surface, a bottom surface, a forward end, and a rearward end, with a length there between.

The outer frame lower rails and the outer frame upper rails are coupled to each other.

There are a plurality of right outer frame riser rails 40 coupling the right upper outer frame rail to the right lower outer frame rail. The right outer frame riser rails are a right forward outer frame riser, a right middle outer frame riser, and a right rearward outer frame riser.

There are a plurality of left outer frame riser rails 44 coupling the left outer frame upper rail to the left outer frame lower rail. The left outer frame riser rails are a left forward outer frame riser and a left middle outer frame riser and a left rearward outer frame riser.

The outer frame also comprises a pair of generally mirror image rectilinear shaped outer frame middle horizontal rails, being an outer frame right middle horizontal rail and an outer frame left horizontal rail 46. Each outer frame middle horizontal rail has an upper surface, a lower surface, and a pair of generally parallel side surfaces, as well as a forward end and a rearward end, with a length there between. The outer frame lower rails are generally parallel with each other.

There is also an inner frame 50. The inner frame comprises several components, in combination.

There is a pair of generally mirror image rectilinear shaped inner frame outer rails 52, being a right inner frame outer rail 52 and a left inner frame outer rail 54. Each of the inner frame outer rails has an inner surface 56, an outer surface, a upper surface, a bottom surface, a forward end 58, and a rearward end 60, with a length there between. The inner frame outer rails are configured to be generally parallel with each other.

The forward end of each of the inner frame outer rails has a downwardly disposed bevel projection 62. Each bevel projection has a lower edge 64. The lower edge of each of the downwardly disposed bevel projections of the inner frame outer rails rides on each of the bevel roller wheels of the lower rail inner forward cross member of the outer frame.

There is a pair of inner frame support rails 66. Each of the inner frame support rails has a generally mirror image configuration. The inner frame support rails each are a generally mirror image of each other. The inner frame support rails each have an upper surface, a bottom surface, an inner surface 68, an outer surface, a forward end, and a rearward end, with a length there between. Each of the inner frame support rails is located adjacent the inner surface of each of the inner frame outer rails.

Each of the pair of inner frame support rails has a plurality of horizontally oriented arcuate roller subassembly mount holes 70 there through. Each of the horizontally oriented arcuate roller subassembly mount holes of the inner frame support rails has an associated horizontally oriented arcuate roller subassembly 72 coupled thereto. Each horizontally oriented arcuate roller subassembly has a horizontally oriented stepped central shaft 74 having a male threaded end 76, and an associated nut 78. Each horizontally oriented arcuate roller subassembly has a vertically oriented roller 80.

The inner surface of each of the inner frame support rails has an L-shaped roller subassembly mount 82. Each of the L-shaped roller subassembly mounts of the inner frame support rails has a generally downwardly disposed outer leg 84 and a horizontally disposed inner leg 86. The horizontally disposed inner leg has a roller shaft hole 88 there through.

Each of the horizontally oriented roller subassembly mounts has an associated vertically oriented roller subassembly. Each inner frame support rail vertically oriented roller subassembly has a stepped vertically oriented central roller shaft 90. Each vertically oriented roller shaft of the vertically oriented roller subassembly has a male threaded end 92 and an associated nut 94. The vertically oriented central shaft of each vertically oriented roller subassembly being configured to be received by and mate with the roller shaft hole of the horizontally disposed inner leg of the roller mount. The inner frame support rails are generally parallel with each other. Each vertically oriented roller subassembly has a horizontally oriented roller 96.

There is a pair of inner frame inner rails 100. The inner frame inner rails each are a generally mirror image of each other. The inner frame inner rails each have an upper surface, a bottom surface, an inner surface 102, an outer surface 104, a forward end, and a rearward end, with a length there between. Each of the inner frame inner rails is located adjacent the inner surface of each of the inner support rails.

The rearward end of inner surface of each of the inner frame inner rails has an arcuate slot plate 106 attached thereto. Each arcuate slot plate has a upper surface, a bottom surface, and a pair of parallel side surfaces, being an outer surface 108 and an inner surface 110. Each arcuate slot plate has a forward end 112 and a rearward end 114, with a length there between. Each arcuate slot plate has a pair of arcuate slots 116 there through. Each arcuate slot running from the inner surface of the arcuate slot plate to the outer surface of the arcuate slot plate, there through.

The arcuate slot plates are located between the inner frame inner rail and the inner frame support rail. The arcuate slot plates allow for movement of the inner frame inner rails relative to the inner frame support rails.

The slots are configured to allow a forward and rearward tilt of the arcuate plate in an amount of between about four degrees and fifteen degrees. In the preferred embodiment, the tilt which is achieved in the forward or rearward direction is approximately six degrees. The six degree tilt is that amount of tilt which is easily perceivable and gives a user who is riding on the arcuate plates a perception of leaning forward or rearward, as would be perceived in deceleration or acceleration of a vehicle under controlled circumstances.

The arcuate slots of the arcuate slot plates are configured to movably receive and mate with each of the vertically oriented rollers of the horizontally oriented roller subassemblies, so as to produce a rocking effect as the arcuate plate moves relative to the vertical rollers of the horizontally oriented roller subassemblies.

The vertically oriented roller subassembly horizontally oriented rollers contacting and riding on the inner surface of each of the arcuate slot plates. The inner surface of each of the arcuate slot plates being generally flat and configured to run along each of the horizontally oriented rollers of each of the vertically oriented arcuate roller subassemblies. The horizontally oriented rollers of the vertically oriented roller subassemblies keep the arcuate plate engaged with the vertically oriented rollers of the horizontally oriented roller subassemblies.

There are a plurality of inner frame cross struts, being an forward inner frame crosse strut 120, a mid forward inner frame cross strut 122 and a middle inner frame cross strut 124 and a rearward inner frame cross strut 126. Each of the inner frame cross struts has a bottom surface, upper surface, a forward surface, a rearward surface, and a right end 128 and a left end 130, with a length there between. Each of the inner frame cross struts is a generally mirror image of each other. Each inner frame cross strut end is coupled to the inner surface of the inner frame outer rails.

The inner frame and the outer frame being movably coupled to the other.

There are a pair of inner frame seat mount rails 140, which couple with each inner frame inner rail, and are oriented generally perpendicular to the inner frame inner rails. Each of the seat mount rails having an inner surface, Each of the inner frame seat mount rails having a upper surface, a lower surface, a forward surface, a rearward surface a right end 144, a left end 146 and a length there between.

There is an inner frame seat mount central hydraulic strut 148. The inner frame seat mount central hydraulic strut has an upper surface, an lower surface, a forward surface, a rearward surface, a right end 150, and a left end 152. The ends of the inner frame seat mount central hydraulic strut are coupled to each of the inner surface of each of the inner frame seat mount rails.

There is a hydraulic cylinder 160. The hydraulic cylinder has a base 162 and a ram 164, with the ram being coupled to the inner frame.

The ram of the hydraulic cylinder is coupled to the rearward cross member of the inner frame. The movement of the hydraulic ram causes a movement of the seat mount of the inner frame.

The hydraulic cylinder base is coupled to the inner frame seat mount central hydraulic strut.

There are a pair of adjustable outer mount inertia balance springs 170. The inertia balance springs couple the inner rearward cross member of the outer frame and the forward end of the inner frame. The balance springs are essential to balance the existing inertia in the simulator. Using the balancing springs, a motivating device, such as the hydraulic cylinder needs only to overcome a small amount of inertia, whereas the spring contributes to the forward motion of the inner frame. This means that the necessary force to move the inner frame is reduced, allowing for smaller components to carry out the operation of the simulator.

There is a system control 180 for controlling a forward and a rearward movement of a seat 182, by moving the seat using the hydraulic cylinder to provide such movement. The control is operatively coupled to a computer 184 having a program 186, hardware 188, and software 190, housed within the computer. The computer controls a visual display on a computer screen 192. The computer is electronically coupled to a user control means 194. The user control means is at least one of the means from the group of control means which includes pedals, steering wheels, shifts, levers, buttons, switches, toggles, pulls, and joysticks, for providing a visual simulation with movement simulation.

There is a seat belt simulation subassembly 200. The seat belt simulation subassembly comprises an adjustable seat belt 202, a pivotable coupler 204, an actuator 206, a spring 208, an arcuate pulley 210, and a terminal attachment 212.

There is a user's seat which is coupled to the seat mount rails. The seat belt is coupled to a user's seat. The pivotable coupler allows the seat belt to be rotated. The spring provides a predetermined tension to the belt. The actuator is operatively coupled to the control so as to add to the simulation of braking and accelerating by the movement of the actuator, in addition to the spring tension of the seat belt, providing a change in the sensation of tension which would occur during braking or accelerating.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the each construction and operation shown and described, and accordingly, all suitable modifications and equivalents may be resorted to, falling within the scope of the invention.

What is claimed as being new and desired to be protected by Letters Patent of the United States is as follows:

1. A simulator device, comprising, in combination:
   an outer frame comprising:
   a pair of mirror image rectilinear shaped outer frame lower rails being a right outer frame lower rail and a left outer frame lower rail, each outer frame lower rail having a forward end and a rearward end;
   a plurality of outer frame lower rail cross members coupling the right lower rail and the left lower rail, each of the cross members having an upper surface;
   a pair of mirror image rectilinear shaped outer frame upper rails being a right outer frame upper rail and a left outer frame upper rail;
   the outer frame lower rails and the outer frame upper rails being coupled to each other;

an inner frame comprising:
a pair of mirror image rectilinear shaped inner frame outer rails being a right inner frame outer rail and a left inner frame outer rail, with each of the inner frame outer rails having an inner surface and an outer surface, each inner frame outer rail having a forward end and a rearward end;
a pair of mirror image rectilinear shaped inner frame support rails being a right inner frame support rail and a left inner frame support rail with each of the inner frame support rails having an inner surface and an outer surface;
the inner frame and the outer frame being movably coupled to the other; and
a hydraulic cylinder having a base and a ram, with the ram being coupled to the inner frame;
the inner surface of each of the inner frame support rails having a pair of L-shaped roller subassembly mounts;
a pair of inner frame inner rails with each inner frame inner rail having a forward end and a rearward end and in inner surface and an outer surface;
the rearward end of outer surface of each of the inner frame inner rails having an arcuate slot plate attached thereto, each arcuate slot plate having an outer surface and an inner surface, each arcuate slot plate having a forward end and a rearward end, with a length there between, with each arcuate slot plate having a pair of arcuate slots there through, with each arcuate slot running from the inner surface of the arcuate slot plate to the outer surface of the arcuate slot plate there through; and
a pair of adjustable outer mount inertia balance springs, the inertia balance springs coupling the inner rearward cross member of the outer frame and the forward end of the inner frame.

2. The simulator devices as described in claim 1, with the device further comprising:
each of the L-shaped roller subassembly mounts of the inner frame support rails having a downwardly disposed outer leg and a horizontally disposed inner leg, with the horizontally disposed inner leg having a vertically oriented roller shaft hole there through, each of the horizontally oriented roller subassembly mounts having an associated vertically oriented roller subassembly having a horizontal roller;
the outer frame having a pair of mirror image rectilinear shaped middle horizontal rails being a right middle horizontal rail and a left horizontal rail;
the outer frame lower rails being parallel with each other; and
a system control for controlling a forward and a rearward movement of a seat by moving the seat using the hydraulic cylinder to provide such movement, the control being operatively coupled to a computer having a program and hardware and software, the computer controlling a visual display on a computer screen, the computer electronically coupled to a user control means, the user control means being at least one of the means from the group of control means which includes pedals and steering wheels and shifts and levers and buttons and switches and toggles and pulls and joysticks, for providing a visual simulation with movement simulation.

3. The simulator devices as described in claim 2, with the device further comprising:
each inner frame support rail vertically oriented roller subassembly having a stepped vertically oriented central roller shaft, with each vertically oriented central roller shaft having a male threaded end and an associated nut, the vertically oriented central shaft of each vertically oriented roller subassembly being configured to be received by and mate with the roller shaft hole of the horizontally disposed inner leg of the roller mount;
a pair of inner frame seat mount rails, with each inner frame seat mount rails having an inner surface;
an inner frame seat mount central hydraulic strut, the inner frame seat mount central hydraulic strut having a right end and a left end, the ends of the inner frame seat mount central hydraulic strut being coupled to each of the inner surface of each of the inner frame seat mount rails; and
the hydraulic cylinder base being coupled to the inner frame seat mount central hydraulic strut.

4. The simulator devices as described in claim 3, with the device further comprising:
the plurality of outer frame cross members comprising a forward cross member and an inner forward cross member and an inner rearward cross member, and a rearward cross member;
each of the pair of inner frame support rails having a plurality of horizontally oriented arcuate roller subassembly mount holes there through with each inner frame support rail vertically oriented arcuate roller subassembly mount hole having associated horizontally oriented arcuate roller subassembly coupled thereto, each horizontally oriented arcuate roller having a horizontally oriented stepped central shaft having a male threaded end and an associated nut, with each horizontally oriented arcuate roller subassembly having a vertically oriented roller;
the arcuate slots of the arcuate slot plate being configured to movably receive and mate with each of the horizontally oriented arcuate roller subassembly vertical rollers so as to produce a rocking effect as the plate moves relative to the horizontally oriented arcuate roller subassembly vertical rollers, the vertically oriented roller subassembly horizontal rollers contacting and riding on inner surface of each of the arcuate slot plates;
the ram of the hydraulic cylinder being coupled to the rearward cross member of the inner frame, the movement of the hydraulic ram causing a movement of the seat mount of the inner frame; and
a seat belt simulation subassembly comprising an adjustable seat belt and an actuator and an arcuate pulley.

5. The simulator devices as described in claim 4, with the device further comprising:
the outer frame lower rail having a lower rail inner forward cross member having an upper surface, the lower rail inner forward cross member having a pair of bevel roller wheels coupled to the upper surface of the lower rail inner forward cross member;
the inner surface of each of the arcuate slot plates being configured to run along in contact with each of the horizontally oriented rollers of each of the vertically oriented arcuate roller subassemblies;
a plurality of right outer frame riser rails coupling the right upper outer frame rail to the right lower outer frame rail;
a plurality of left outer frame riser rails coupling the left outer frame upper rail to the left outer frame lower rail; and a plurality of inner frame cross struts, each inner frame cross strut having opposing ends, with the inner frame cross strut ends being coupled to the inner surface of the inner frame outer rails.

6. The simulator devices as described in claim 5, with the device further comprising:
the forward end of each of the inner frame outer rails having a downwardly disposed bevel projection with each bevel projection having a lower edge, the lower edge of each of the downwardly disposed bevel projections of the inner frame outer rails riding on each of the bevel roller wheels of the lower rail inner forward cross member of the outer frame; and
the seat belt coupled to a user's seat, with a seat belt spring providing a tension to the belt with the actuator being operative coupled to the control so as to add to the simulation of braking and accelerating.

7. The simulator devices as described in claim 6, with the device further comprising each of the inner frame seat mount rails being coupled to the inner surfaces of the arcuate slot plates.

8. A simulator device, comprising, in combination:
an outer frame having at least outer frame one roller;
an inner frame slidably coupled to the outer frame, the inner frame having two inner frame support rails and at least one bearing surface which is mated to and rides on the at least one outer frame roller;
at least one roller subassembly having a roller, the roller subassembly being coupled to the inner frame; and
at least one arcuate plate, the arcuate plate having at least one arcuate slot, with the arcuate slot receiving the roller subassembly vertical roller within the arcuate slot;
the inner frame and the outer frame being movably coupled to the other; and
a hydraulic cylinder having a base and a ram, with the ram being coupled to the inner frame;
an inner surface of each of the inner frame support rails having a pair of L-shaped roller subassembly mounts;
a pair of inner frame inner rails with each inner frame inner rail having a forward end and a rearward end and in inner surface and an outer surface;
the rearward end of outer surface of each of the inner frame inner rails having an arcuate slot plate attached thereto, each arcuate slot plate having the outer surface and the inner surface, each arcuate slot plate having the forward end and the rearward end, with a length there between, with each arcuate slot plate having a pair of arcuate slots there through, with each arcuate slot running from the inner surface of the arcuate slot plate to the outer surface of the arcuate slot plate there through; and
a pair of adjustable outer mount inertia balance springs, the inertia balance springs coupling the inner rearward cross member of the outer frame and the forward end of the inner frame.

9. The simulator device of claim 8, further comprising:
the roller subassembly comprising at least one vertically oriented roller subassembly having a horizontal roller, the vertically oriented roller subassembly being coupled to the inner frame; and
a seat mount coupled to the arcuate plate.

10. The simulator device of claim 9, further comprising:
a control being operatively coupled to the simulator device, the control having a computer and a program and software and hardware, the control having associated therewith at least one input device from the group of input devices which includes pedals, steering wheels, shifts, levers, buttons, switches, toggles, pulls, and joysticks.

11. The simulator device of claim 10, further comprising, in combination:
a seat belt simulation subassembly coupled there to the outer frame, the seat belt simulation subassembly comprising an adjustable seat belt, an actuator, and an arcuate pulley, the seat belt coupled to the frame, with the spring providing a tension to the belt, the actuator being operatively coupled to the control so as to withdraw the seat belt and extend the seat belt.

\* \* \* \* \*